US012195909B2

(12) United States Patent
Hartnett et al.

(10) Patent No.: US 12,195,909 B2
(45) Date of Patent: *Jan. 14, 2025

(54) CHEMISTRY DISPENSING ASSEMBLY FOR A LAUNDRY APPLIANCE

(71) Applicant: WHIRLPOOL CORPORATION, Benton Harbor, MI (US)

(72) Inventors: Christopher A. Hartnett, St. Joseph, MI (US); James Jeffery, St. Joseph, MI (US); Bruno T. Ramasco, Stevensville, MI (US); Guy M. Kazmierzak, Dowagiac, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,553

(22) Filed: Sep. 6, 2023

(65) Prior Publication Data

US 2023/0416970 A1 Dec. 28, 2023

Related U.S. Application Data

(63) Continuation of application No. 17/157,138, filed on Jan. 25, 2021, now Pat. No. 11,788,225.

(51) Int. Cl.

| | |
|---|---|
| ***D06F 39/02*** | (2006.01) |
| ***B01F 23/451*** | (2022.01) |
| ***B01F 25/10*** | (2022.01) |
| ***B01F 25/421*** | (2022.01) |
| ***B01F 25/452*** | (2022.01) |
| ***D06F 37/26*** | (2006.01) |
| *B01F 101/00* | (2022.01) |
| *B01F 101/48* | (2022.01) |
| *D06F 21/06* | (2006.01) |

(52) U.S. Cl.

CPC .......... *D06F 39/028* (2013.01); *B01F 23/451* (2022.01); *B01F 25/103* (2022.01); *B01F 25/4231* (2022.01); *B01F 25/4521* (2022.01); *D06F 37/26* (2013.01); *D06F 39/022* (2013.01); *B01F 2101/4505* (2022.01); *B01F 2101/48* (2022.01); *D06F 21/06* (2013.01)

(58) Field of Classification Search

CPC .......... D06F 21/06; D06F 37/02; D06F 37/26; D06F 39/022; D06F 39/028

See application file for complete search history.

(56) References Cited

U.S. PATENT DOCUMENTS

| | | | |
|---|---|---|---|
| 6,065,171 | A | 5/2000 | Tubman et al. |
| 9,010,160 | B2 | 4/2015 | Nieh et al. |
| 9,689,105 | B2 | 6/2017 | Martinez Villarreal |

(Continued)

FOREIGN PATENT DOCUMENTS

| | | | |
|---|---|---|---|
| CN | 107237089 | A | 10/2017 |
| CN | 112080902 | A | 12/2020 |

(Continued)

*Primary Examiner* — Joseph L. Perrin

(74) *Attorney, Agent, or Firm* — Price Heneveld LLP

(57) ABSTRACT

A chemistry dispensing assembly for a laundry appliance includes a reservoir that dispenses a laundry chemistry to a treatment chamber. A mixing channel is positioned below the reservoir that receives the laundry chemistry dispensed from the reservoir. A fluid assembly delivers a fluid carrier through a flow path that includes the mixing channel. The mixing channel is defined between an underside of the reservoir and an upper surface of the mixing channel.

20 Claims, 6 Drawing Sheets

(56) References Cited

U.S. PATENT DOCUMENTS

| | | | |
|---|---|---|---|
| 9,885,136 | B1 | 2/2018 | Beaudreault et al. |
| 9,963,819 | B2 | 5/2018 | Leibman et al. |
| 10,132,022 | B2 | 11/2018 | Leibman et al. |
| 10,442,588 | B2 | 10/2019 | Bischoff et al. |
| 10,648,120 | B2 | 5/2020 | Gonzaga et al. |
| 2010/0064444 | A1 | 3/2010 | Nieh et al. |
| 2016/0237612 | A1 | 8/2016 | Ghosh et al. |
| 2022/0235511 | A1 | 7/2022 | Hartnett et al. |

FOREIGN PATENT DOCUMENTS

| | | | |
|---|---|---|---|
| JP | 2001078946 | A | 3/2001 |
| WO | 2014194396 | A1 | 12/2014 |

CHEMISTRY DISPENSING ASSEMBLY FOR A LAUNDRY APPLIANCE

CROSS-REFERENCE TO RELATED APPLICATION

The present application is a continuation of U.S. patent application Ser. No. 17/157,138 filed Jan. 25, 2021, entitled CHEMISTRY DISPENSING ASSEMBLY FOR A LAUNDRY APPLIANCE, now U.S. Pat. No. 11,788,225, the entire disclosure of which is hereby incorporated herein by reference.

FIELD OF THE DEVICE

The device disclosed herein is in the field of laundry appliances, and more specifically, a laundry appliance including a chemistry dispensing mechanism having a mixing channel positioned immediately below a chemistry dispenser for mixing laundry chemistry with a fluid carrier.

SUMMARY OF THE DISCLOSURE

According to one aspect of the present disclosure, a laundry appliance includes a treatment chamber for processing articles of laundry. A cartridge housing includes a removable laundry cartridge that dispenses a laundry chemistry to the treatment chamber. A mixing channel is positioned below the cartridge housing that receives the laundry chemistry dispensed from the removable laundry cartridge. A fluid assembly delivers a fluid carrier through a flow path that includes the mixing channel. The laundry chemistry and the fluid carrier are delivered to a chemistry mixing section of a tub ring positioned above the treatment chamber and below the mixing channel.

According to another aspect of the present disclosure, a chemistry dispensing assembly for a laundry appliance includes a reservoir that dispenses a laundry chemistry to a treatment chamber. A mixing channel is positioned below the reservoir that receives the laundry chemistry dispensed from the reservoir. A fluid assembly delivers a fluid carrier through a flow path that includes the mixing channel. The mixing channel is defined between an underside of the reservoir and an upper surface of the mixing channel.

According to yet another aspect of the present disclosure, a laundry appliance includes a rotating drum for processing articles of laundry. A cartridge housing includes a removable laundry cartridge that dispenses a laundry chemistry for delivery to the rotating drum. A mixing plate is positioned below the cartridge housing that defines a mixing channel. The mixing channel receives the laundry chemistry dispensed from the removable laundry cartridge. A fluid assembly delivers a fluid carrier through a flow path that includes the mixing channel. The mixing channel is defined between an underside of the removable laundry cartridge and an upper surface of the mixing plate. The laundry chemistry and the fluid carrier are delivered to a chemistry mixing section of a tub ring that is positioned above the rotating drum and below the mixing channel.

These and other features, advantages, and objects of the present disclosure will be further understood and appreciated by those skilled in the art by reference to the following specification, claims, and appended drawings.

Figure 1:
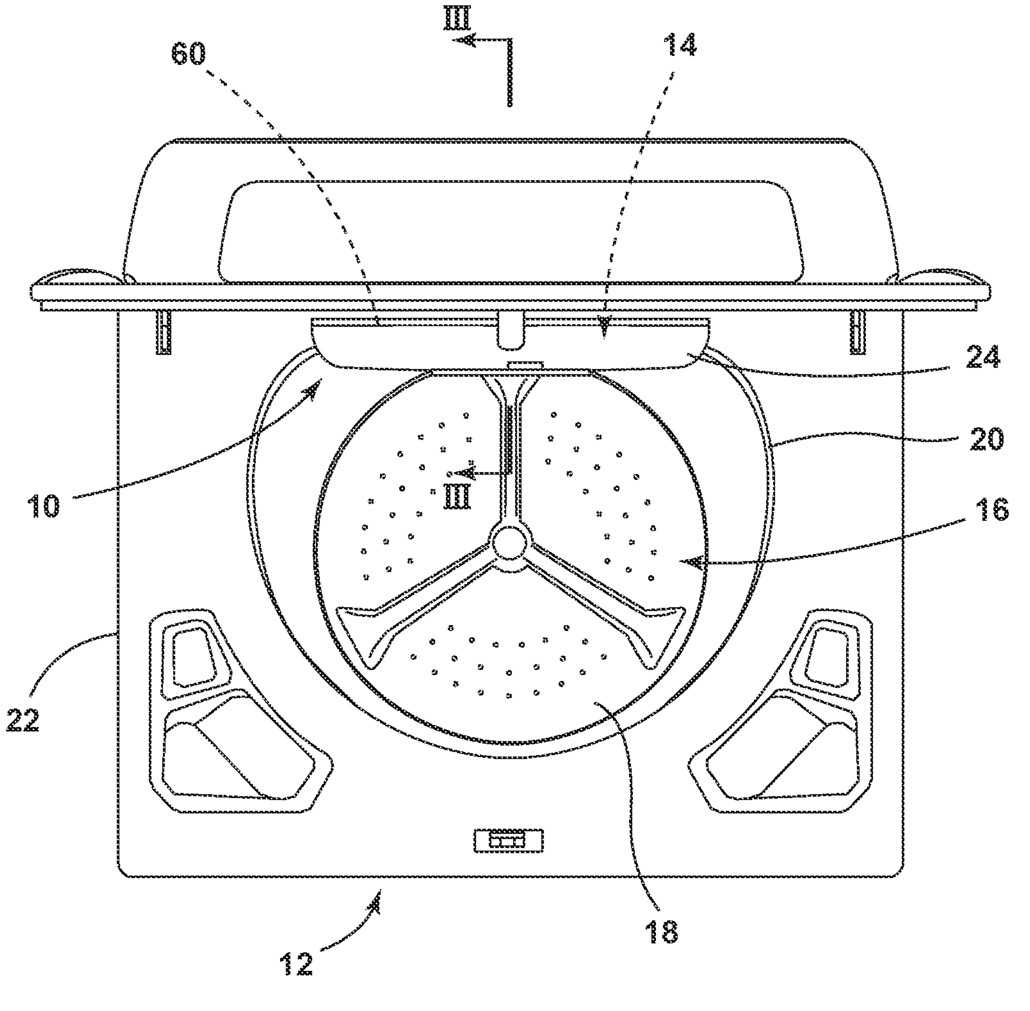
FIG. 1 is a top perspective view of a laundry appliance incorporating an aspect of the chemistry dispensing mechanism.
Figure 2:
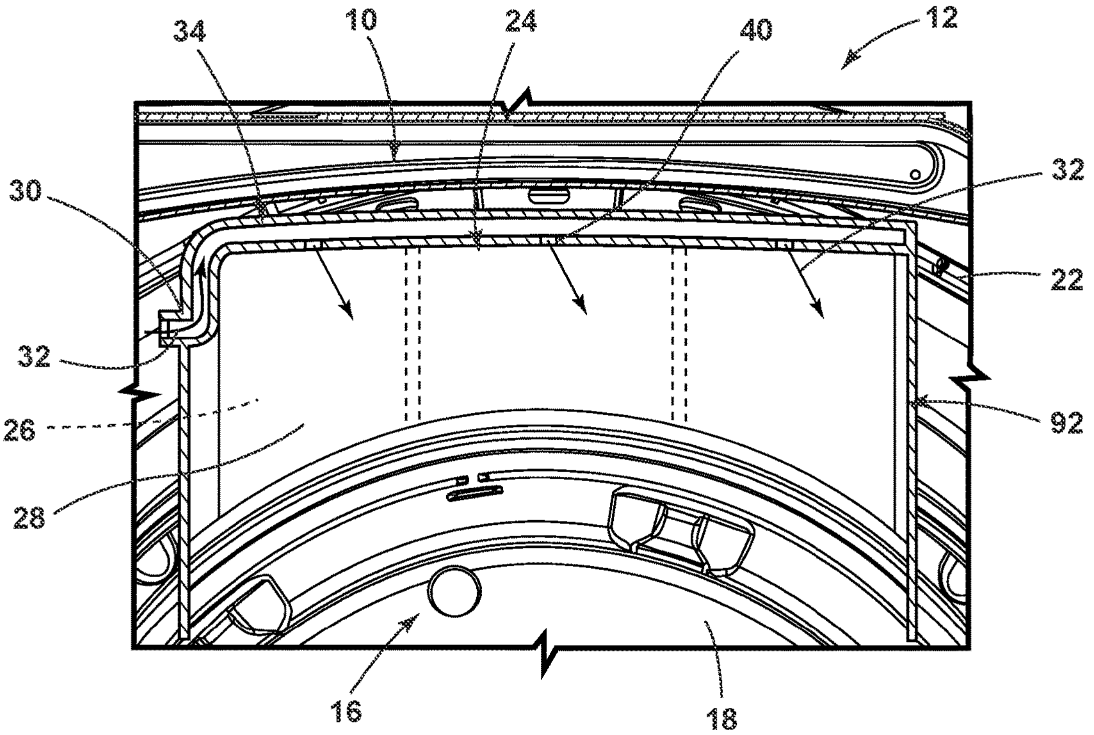
FIG. 2 is a top plan view of an aspect of a mixing channel for the chemistry dispensing assembly.
Figure 3:
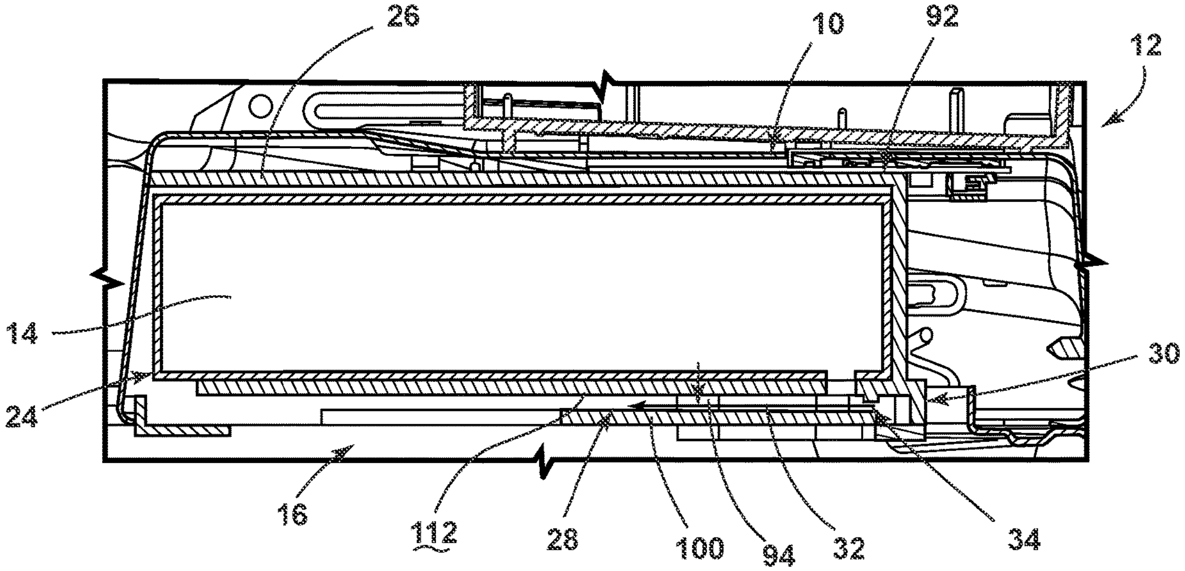
FIG. 3 is a cross-sectional view of the laundry appliance of FIG. 1 taken along line III-III, and showing a relationship of a removable laundry cartridge with the mixing channel.
Figure 4:
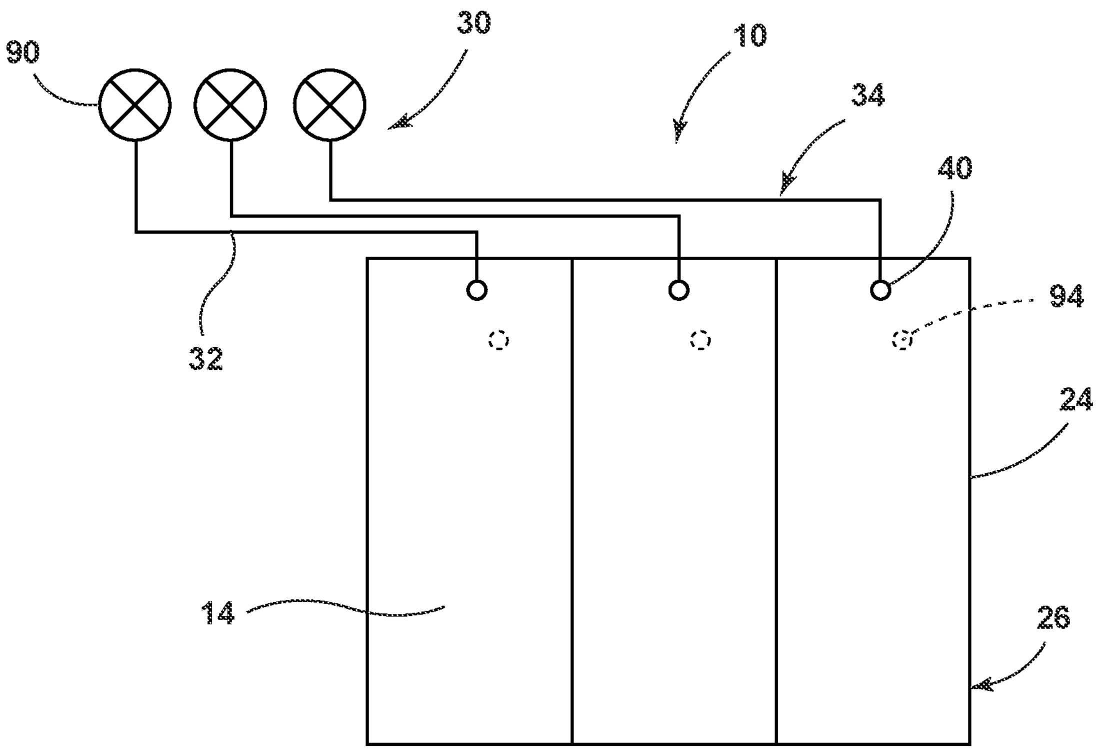
FIG. 4 is a schematic diagram illustrating a fluid assembly incorporated within an aspect of the chemistry dispensing mechanism.
Figure 5:
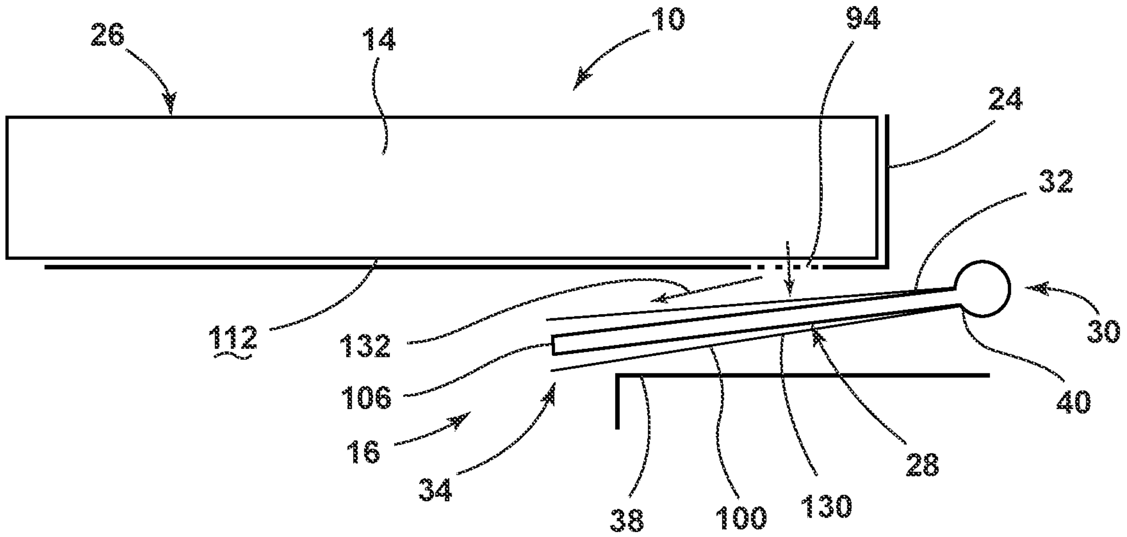
FIG. 5 is a cross-sectional schematic diagram illustrating an aspect of a mixing channel for the chemistry dispensing mechanism.
Figure 6:
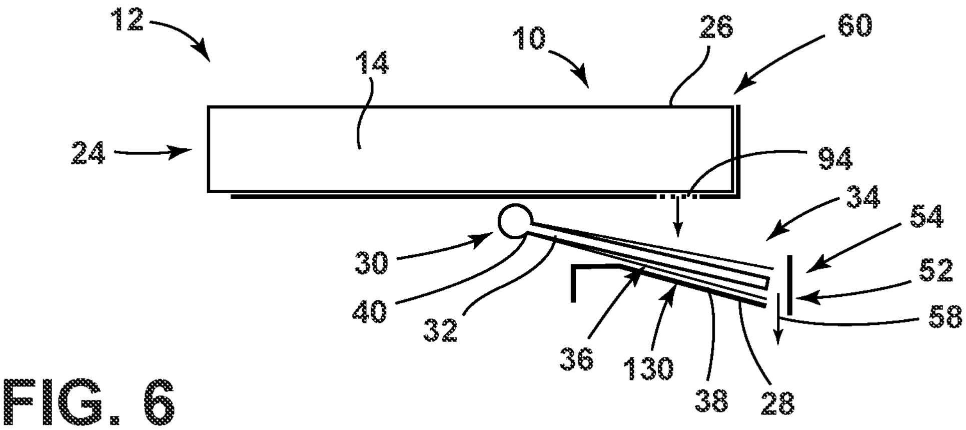
FIG. 6 is another cross-sectional schematic diagram illustrating a configuration of the mixing channel for the chemistry dispensing mechanism.
Figure 7:
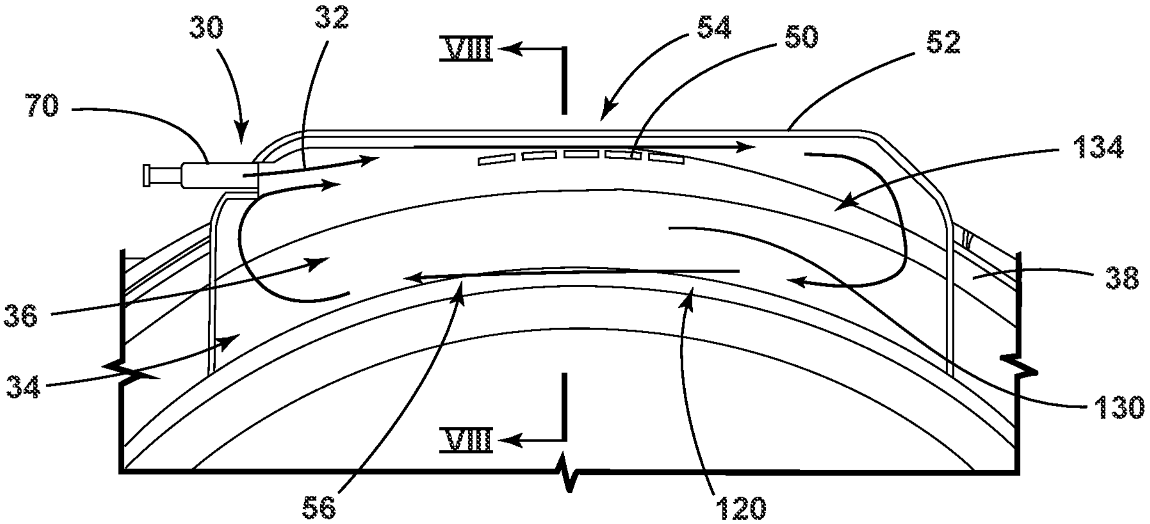
FIG. 7 is a schematic top plan view of a tub ring incorporating a chemistry mixing section for mixing laundry chemistry with a fluid carrier.
Figure 8:
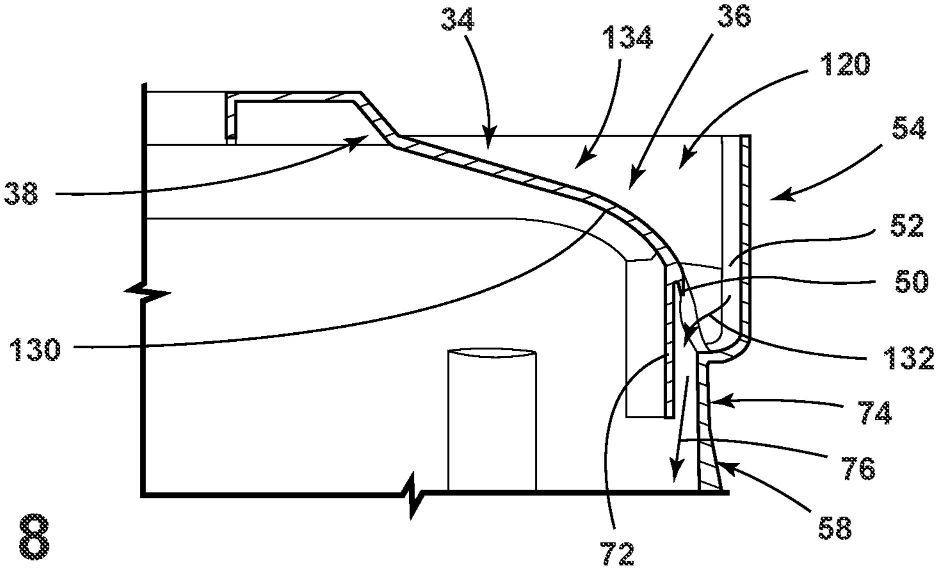
FIG. 8 is a cross-sectional view of the tub ring of FIG. 7 taken along line VIII-VIII and showing positioning of the plurality of apertures and the deflector of the tub ring.

The components in the figures are not necessarily to scale, emphasis instead being placed upon illustrating the principles described herein.

DETAILED DESCRIPTION

The present illustrated embodiments reside primarily in combinations of method steps and apparatus components related to a chemistry dispensing mechanism for a laundry appliance that delivers laundry chemistry using a fluid carrier. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-8, reference numeral 10 generally refers to a chemistry dispensing mechanism that is incorporated within a laundry appliance 12, where the chemistry dispensing mechanism 10 disposes a laundry chemistry 14 from a reservoir 60, typically incorporated within a removable laundry cartridge 26, toward a treatment chamber 16 of the laundry appliance 12. The treatment chamber 16 can take the form of a rotating drum 18 that is positioned within a tub 20, that is in turn positioned within an outer cabinet 22. The rotating drum 18 can operate about a vertical axis or a horizontal axis, depending upon the configuration of the particular appliance 12. According to various aspects of the device, the laundry appliance 12 includes the treatment chamber 16 for processing articles of laundry. A cartridge housing 24 includes a removable laundry cartridge 26 that includes an internal reservoir 60. The removable laundry cartridge 26 dispenses the laundry chemistry 14 toward the treatment chamber 16. A mixing channel 28 is positioned below the cartridge housing 24, where the mixing channel 28 is configured to receive the laundry chemistry 14 that is dispensed from the removable laundry cartridge 26. A fluid assembly 30 delivers a fluid carrier 32 through a flow path 34 that includes the mixing channel 28. The laundry chemistry 14 and the fluid carrier 32 are delivered to a chemistry mixing section 36 of a tub ring 38 that is positioned above the rotating drum 18 and below the mixing channel 28. In this manner, the flow path 34 is positioned to deliver the fluid carrier 32 from one or more nozzles 40 and through the mixing channel 28 to receive dispensed laundry chemistry 14 from the removable laundry cartridges 26 or a refillable reservoir 60. The dispensed laundry chemistry 14 and the fluid carrier 32 are then delivered from the mixing channel 28 and to the treatment chamber 16 via a chemistry mixing section 36 of the tub ring 38.

Referring again to FIGS. 7 and 8, the chemistry mixing section 36 of the tub ring 38 includes a plurality of apertures 50 that are positioned to deliver the laundry chemistry 14 and the fluid carrier 32 into the treatment chamber 16. Typically, the plurality of apertures 50 are positioned within a gutter area 52. This gutter area 52 of the chemistry mixing section 36 is positioned below the mixing channel 28, typically at the rear 54 of the tub ring 38. In this configuration, the dispensed fluid carrier 32 with the laundry chemistry 14 mixed therein operates in a generally cyclonic motion 56 within the chemistry mixing section 36 of the tub ring 38. Through the cyclonic motion 56 of the fluid carrier 32 and the laundry chemistry 14, these components form a processing fluid 58 that is delivered through the plurality of apertures and into the treatment chamber 16.

In certain aspects of the device, the fluid assembly 30 can include a ring fluid nozzle 70 that directs a portion of the fluid carrier 32 as a mixing stream of the fluid carrier 32 into the chemistry mixing section 36 of the tub ring 38. This mixing stream of the fluid carrier 32 from the ring fluid nozzle 70 can promote the cyclonic motion 56 of the fluid carrier 32 and the laundry chemistry 14 that forms the processing fluid 58. This processing fluid 58 is then directed through the plurality of apertures 50 positioned within the gutter area 52 of the chemistry mixing section 36. Through the use of this cyclonic structure 134 that mixes the laundry chemistry 14 with the fluid carrier 32, the processing fluid 58 is directed through the plurality of apertures 50 and into a deflector 72 and that defines the dispensing slot 74. This dispensing slot 74 is configured to direct the processing fluid 58 in a generally downward direction 76 and into the treatment chamber 16. The dispensing slot 74 can be used to prevent splashing of the processing fluid 58 and also ensures a complete dispense of the laundry chemistry 14 from the removable laundry cartridge 26, or other reservoir 60, into the treatment chamber 16.

Using the fluid assembly 30, when the laundry chemistry 14 is dispensed from the removable laundry cartridge 26, the laundry chemistry 14 is continually mixed with additional portions of fluid carrier 32 that progressively mixes and dilutes the laundry chemistry 14 for forming the processing fluid 58 that is delivered to the treatment chamber 16.

In certain aspects of the device, the laundry chemistry 14 can be in the form of a highly concentrated solution of laundry chemistry 14. This highly concentrated solution is configured to be diluted before being dispensed into the treatment chamber 16 to ensure a safe proportion of laundry chemistry 14 to the fluid carrier 32 that forms the processing fluid 58.

Referring again to FIGS. 1-8, the chemistry mixing section 36 of the tub ring 38 is positioned above the treatment chamber 16 and below the mixing channel 28. The tub ring 38 includes the deflector 72 that is positioned adjacent to the plurality of apertures 50 to define the dispensing slot 74 that is below the chemistry mixing section 36. Through this configuration, the flow path 34 delivers the fluid carrier 32 and the laundry chemistry 14 into the treatment chamber 16, and also serves to mix the fluid carrier 32 and the laundry chemistry 14 to form the processing fluid 58.

Referring now to FIGS. 2-6, the fluid assembly 30 for the chemistry dispensing mechanism 10 can include a plurality of fluid valves 90. Each of these fluid valves 90 is configured to be positioned to correspond to a respective removable laundry cartridge 26 that is received within the cartridge receptacles 92 of the cartridge housing 24. Each removable laundry cartridge 26 is configured to have a dedicated dispensing outlet 94 that delivers the laundry chemistry 14 from the removable laundry cartridge 26 and toward the mixing channel 28. The fluid valves 90 can also correspond to respective reservoirs 60 that are defined within the chemistry dispensing mechanism 10. Each fluid valve 90 directs a corresponding flow of the fluid carrier 32 below a respective dispensing outlet 94 of the laundry cartridges 26 or reservoirs 60. Through this configuration, the various fluid valves 90 of the fluid assembly 30 can be activated and deactivated depending upon which removable laundry cartridges 26 or reservoirs 60 are assigned for dispensing laundry chemistry 14 in a particular laundry cycle. It is also contemplated that the fluid assembly 30 can include a single fluid valve 90 that directs a fluid carrier 32 to a plurality of nozzles 40 that moves the fluid carrier 32 through all or substantially all of the mixing channel 28. The fluid valves 90 can each be coupled with hot and cold water supplies. Accordingly, the temperature of the fluid carrier 32 can be adjusted based upon the laundry cycle selected. In addition, the fluid valves 90 can be attached to a supply of recirculating fluid that is recirculated through the appliance 12.

Figure 9:
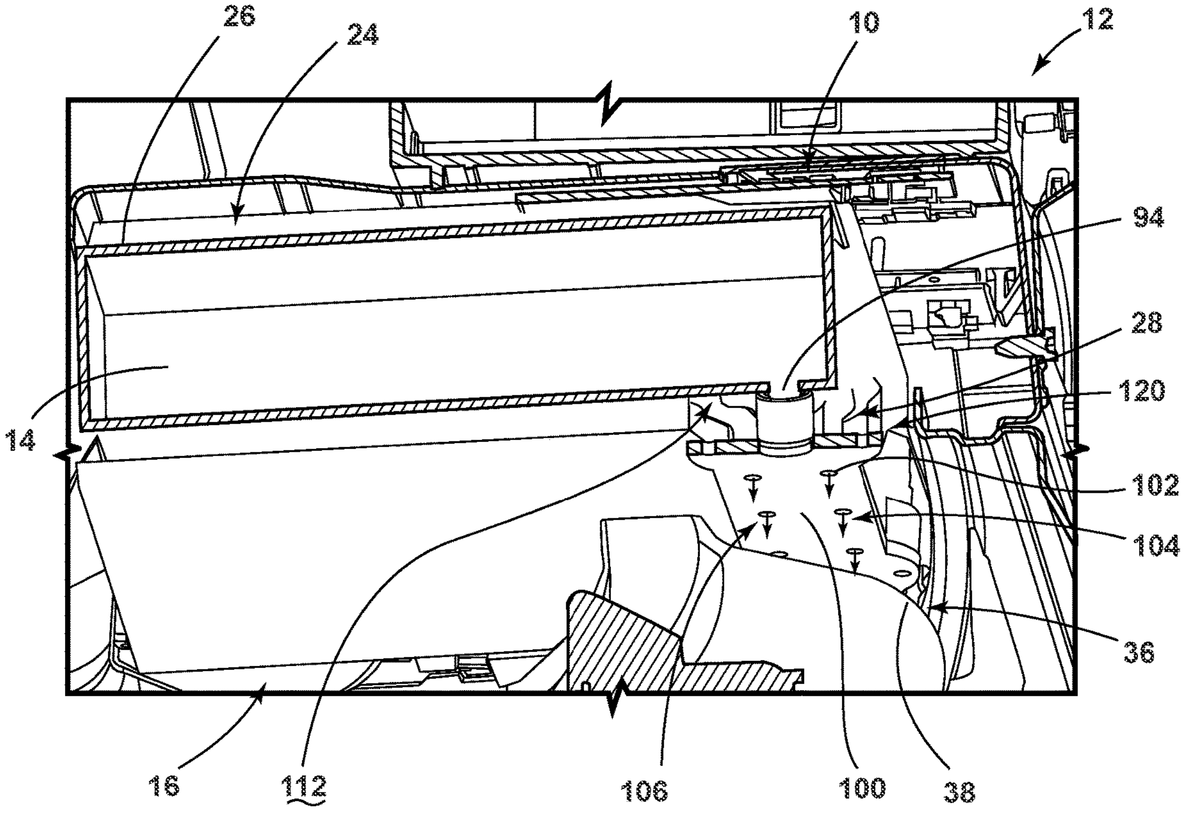
FIG. 9 is a cross-sectional view of an aspect of the chemistry dispensing mechanism incorporating a plurality of perforations within the mixing channel.

Referring now to FIG. 9, the mixing channel 28 of the chemistry dispensing mechanism can include a mixing plate 100 that is positioned below the cartridge housing 24 and the plurality of removable laundry cartridges 26. This mixing plate 100 includes a plurality of perforations 102 that allows a fluid carrier 32 and the laundry chemistry 14 to define a dispensing shower 104 that is dispensed from the mixing channel 28 into the chemistry mixing section 36 of the tub ring 38. This dispensing shower 104 includes an at least partially mixed solution 106 of the fluid carrier 32 and the laundry chemistry 14. This partially mixed solution 106 is then circulated within the chemistry mixing section 36 of the tub ring 38 to form the processing fluid 58 that is dispensed into the treatment chamber 16 for the appliance 12. In certain aspects of the device, the partially mixed solution 106 can be in the form of the processing fluid 58. In such an embodiment, the mixing channel 28 can provide for sufficient mixing of the laundry chemistry 14 and the fluid carrier 32 to define the processing fluid 58.

Figure 10:
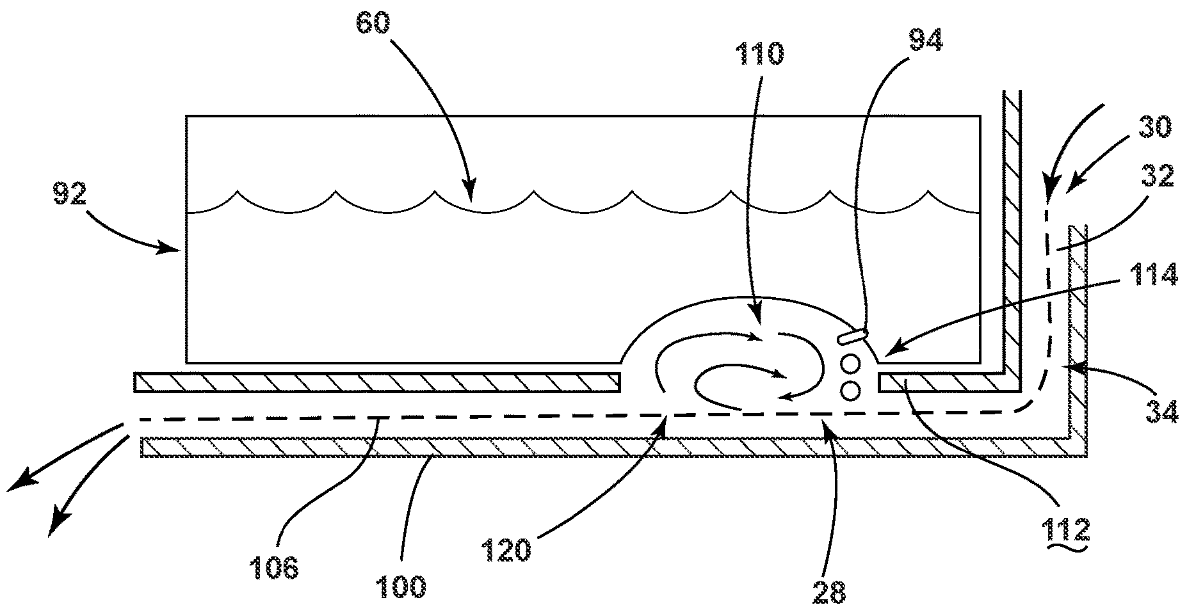
FIG. 10 is a cross-sectional schematic view of an aspect of the chemistry dispensing mechanism and incorporating a turbulence section that is defined between the mixing plate for the mixing channel and an underside of a removable laundry cartridge.

Referring now to FIG. 10, the mixing plate 100 can define the mixing channel 28 that is immediately below the cartridge housing 24. In such a configuration, the mixing channel 28 can include an expanded turbulence section 110 that receives the fluid carrier 32 and directs the fluid carrier 32 in a turbulent flow against the underside 112 of the removable laundry cartridge 26. Within this expanded turbulence section 110, the turbulent flow of the fluid carrier 32 is circulated therein to define a pre-mix chamber 114 that partially mixes the laundry chemistry 14 with the fluid carrier 32. The areas of the mixing channel 28 that lead into and extend from the expanded turbulence section 110 can define a minimal clearance. Through this configuration, when the fluid carrier 32 reaches the expanded turbulence section 110, the fluid carrier 32 can mix within the pre-mix chamber 114 to receive the laundry chemistry 14 from the removable laundry cartridge 26. The pre-mix chamber 114 also allows for an at least partial combination or mixed solution 106 of the laundry chemistry 14 and the fluid carrier 32 to at least partially define the processing fluid 58. This partially mixed solution 106 can be delivered either directly into the treatment chamber 16, or can be delivered to the chemistry mixing section 36 of the tub ring 38 for further mixing to define the processing fluid 58.

Referring again to FIGS. 1-10, the various aspects of the device define a mixing channel 28 that is positioned below the removable laundry cartridges 26, or other laundry chemistry reservoir 60, and above a tub ring 38 for a treatment chamber 16. Using the mixing channel 28, a fluid carrier 32 can be used to move the laundry chemistry 14 from the removable laundry cartridge 26 and at least partially mix the laundry chemistry 14 within the flow path 34 for generating the processing fluid 58 that is dispensed into the treatment chamber 16. Using this flow path 34 and the various aspects of the mixing channel 28, highly concentrated versions of laundry chemistry 14 can be dispensed. The flow path 34 progressively dilutes the concentrated laundry chemistry 14 to form a usable proportion of the processing fluid 58 for use within the treatment chamber 16 of the appliance 12.

Referring again to FIGS. 1-10, the chemistry dispensing mechanism 10 for the laundry appliance 12 includes the cartridge housing 24 that receives the removable laundry cartridge 26 within cartridge receptacles 92. The removable laundry cartridges 26 are adapted to dispense a laundry chemistry 14, typically a concentrated version of the laundry chemistry 14, to the treatment chamber 16. The mixing channel 28 is positioned below the cartridge housing 24 and receives the laundry chemistry 14 that is dispensed from the removable laundry cartridge 26. Typically, a cartridge housing 24 will include a plurality of cartridge receptacles 92 for receiving corresponding pluralities of removable laundry cartridges 26. These various removable laundry cartridges 26 can include different laundry chemistries that are used within various laundry cycles for the appliance 12. These laundry chemistries can include, but are not limited to, detergent, fabric softener, bleach, fragrancing agents, pre-wash fluids, combinations thereof, and other similar laundry chemistries. The fluid assembly 30 delivers the fluid carrier 32 through a portion of flow path 34 that includes the mixing channel 28 of the chemistry dispensing mechanism 10. The mixing channel 28 is defined between the underside 112 of the removable laundry cartridge 26 and a portion of a mixing plate 100. As discussed above, the mixing channel 28 can be at least partially defined by the mixing plate 100, where an upper surface of the mixing plate 100 defines at least a portion of the mixing channel 28.

Referring again to FIGS. 2-10, in certain aspects of the device, the laundry chemistry 14 and the fluid carrier 32 are adapted to be delivered from the mixing channel 28 to the tub ring 38 for further mixing with the fluid carrier 32 to define the processing fluid 58. Accordingly, the flow path 34 can include a mixing channel 28 and the tub ring 38 that define various mixing stages for combining the laundry chemistry 14 with the fluid carrier 32 to form the processing fluid 58. It is also contemplated that the flow path 34 can define a continuous channel that continually mixes and dilutes the laundry chemistry 14 with the fluid carrier 32.

Referring again to FIGS. 9 and 10, the mixing channel 28 can include various additional features for mixing and delivering the laundry chemistry 14 and the fluid carrier 32 to the treatment chamber 16. These features can include the mixing plate 100 having the perforations 102, exemplified in FIG. 9, as well as the expanded turbulence section 110 exemplified in FIG. 10. These features of the mixing channel 28 can be used to mix, or at least pre-mix, the laundry chemistry 14 with the fluid carrier 32. As discussed above, the mixing channel 28 is used to at least partially mix or fully mix the concentrated laundry chemistry 14 with the fluid carrier 32 to define a usable proportion of these components for forming the processing fluid 58 that is used within the treatment chamber 16.

Referring again to FIGS. 1-10, the laundry appliance 12 includes a rotating drum 18 for processing articles of laundry. The cartridge housing 24 includes a reservoir 60, such as the removable laundry cartridges 26 within respective cartridge receptacles 92. The removable laundry cartridges 26 dispense the laundry chemistry 14 that is delivered to the rotating drum 18. The mixing plate 100 is positioned below the cartridge housing 24, where the mixing plate 100 defines, at least partially, the mixing channel 28 for the chemistry dispensing mechanism 10. The mixing plate 100 receives the laundry chemistry 14 that is dispensed from the removable laundry cartridge 26. The fluid assembly 30 delivers the fluid carrier 32 through the flow path 34 that includes the mixing channel 28. The mixing channel 28 is defined between the underside 112 of the removable laundry cartridge 26 and the upper surface of the mixing plate 100. The laundry chemistry 14 and the fluid carrier 32 are delivered to a chemistry mixing section 36 of the tub ring 38 that is positioned above the rotating drum 18 and below the mixing channel 28. As discussed above, this flow path 34 defines a multi-station mixing assembly 120 that combines the laundry chemistry 14 with the fluid carrier 32 to form the processing fluid 58.

It is contemplated that, in certain aspects of the device, the mixing of the laundry chemistry 14 with the fluid carrier 32 can occur within the mixing channel 28. The processing fluid 58 is then delivered from the mixing channel 28 into the treatment chamber 16 for use in processing articles of laundry. Typically, the mixing channel 28 will deliver the partially mixed solution 106 from the mixing channel 28 and to the chemistry mixing section 36 of the tub ring 38. From this chemistry mixing section 36, the mixed solution 106 can be mixed with additional amounts of the fluid carrier 32 to form the processing fluid 58. The processing fluid 58, being fully mixed, is then delivered to the treatment chamber 16 via the plurality of apertures 50 defined within the gutter area 52 of the chemistry mixing section 36.

As discussed above, the chemistry dispensing mechanism 10 disclosed herein is typically used within vertical-axis appliances 12. However, it is contemplated that the chemistry dispensing mechanism 10 disclosed herein can also be used with respect to a horizontal-axis appliance 12 as well as combination washing and drying appliances 12.

The fluid carrier 32 described herein can include water from an external source. It is also contemplated that the fluid carrier 32 can include a recycled fluid that is delivered from the treatment chamber 16, through a recirculating conduit, and toward the chemistry dispensing mechanism 10. It is also contemplated that the fluid carrier 32 can be a combination of recirculated fluid and water from the external source.

Referring again to FIGS. 5 and 6, it is contemplated that the tub ring 38 can include an angled section 130 that leads toward the treatment chamber 16 within the rotating drum 18. This angled section 130 can angle directly into the treatment chamber 16, in a generally forward direction 132. It is also contemplated that the angled section 130 can form a portion of the cyclonic structure 134 of the chemistry mixing section 36 that leads to the plurality of apertures 50 of the gutter area 52. Using this angled section 130 of the tub ring 38, additional mixing of the laundry chemistry 14 and the fluid carrier 32 can be accomplished for generating the processing fluid 58 that is used within the laundry cycle of the appliance 12.

The various sections of the flow path 34, such as the mixing channel 28 and the chemistry mixing section 36 of the tub ring 38 can be also used to combine various combinations of laundry chemistry 14 together. In certain aspects of the device, combinations of the laundry chemistries 14 described herein may be mixed together to form variations of the processing fluid 58 for accomplishing certain laundry cycles. The flow path 34 that includes the mixing channel 28 and the chemistry mixing section 36 of the tub ring 38 can be used to fully combine and mix the laundry chemistries 14 together to form the appropriate processing fluid 58 that is used within the treatment chamber 16. It should be understood that the various aspects of the chemistry dispensing mechanism 10 described herein can be used with a removable laundry cartridge 26 having an internal reservoir 60, or a refillable reservoir 60 that is not typically removable from the remainder of the chemistry dispensing mechanism 10.

According to another aspect of the present disclosure, a laundry appliance includes a treatment chamber for processing articles of laundry. A cartridge housing includes a removable laundry cartridge that dispenses a laundry chemistry to the treatment chamber. A mixing channel is positioned below the cartridge housing that receives the laundry chemistry dispensed from the removable laundry cartridge. A fluid assembly delivers a fluid carrier through a flow path that includes the mixing channel. The laundry chemistry and the fluid carrier are delivered to a chemistry mixing section of a tub ring positioned above the treatment chamber and below the mixing channel.

According to another aspect, the chemistry mixing section of the tub ring includes a plurality of apertures that are positioned to deliver the laundry chemistry and the fluid carrier to the treatment chamber.

According to yet another aspect, the chemistry mixing section includes a cyclonic structure that mixes the laundry chemistry with the fluid carrier to define a processing fluid. The plurality of apertures are positioned proximate a rear of the cyclonic structure.

According to another aspect of the present disclosure, the fluid assembly includes a plurality of fluid valves. Each fluid valve corresponds to a cartridge receptacle of the cartridge housing.

According to another aspect, the tub ring includes a deflector that extends from an underside of the tub ring. The plurality of apertures direct the processing fluid toward the deflector.

According to yet another aspect, the fluid assembly includes a fluid nozzle that directs a mixing stream into the cyclonic structure for generating a cyclonic motion.

According to another aspect of the present disclosure, the mixing channel includes a mixing plate having a plurality of perforations and the laundry chemistry and the fluid carrier are directed downward through the plurality of perforations and toward the tub ring.

According to another aspect, the mixing channel and the cartridge housing define an expanded turbulence section that receives the fluid carrier against an underside of the removable laundry cartridge.

According to yet another aspect, the turbulence section defines a pre-mix chamber that partially mixes the laundry chemistry with the fluid carrier.

According to another aspect of the present disclosure, a chemistry dispensing assembly for a laundry appliance includes a reservoir that dispenses a laundry chemistry to a treatment chamber. A mixing channel is positioned below the reservoir that receives the laundry chemistry dispensed from the reservoir. A fluid assembly delivers a fluid carrier through a flow path that includes the mixing channel. The mixing channel is defined between an underside of the reservoir and an upper surface of the mixing channel.

According to another aspect, the laundry chemistry and the fluid carrier are delivered from the mixing channel to a tub ring for further mixing with the fluid carrier to define a processing fluid.

According to yet another aspect, the tub ring includes a plurality of apertures that are configured to dispense the processing fluid into a treatment chamber.

According to another aspect of the present disclosure, the tub ring includes a chemistry mixing section positioned above the treatment chamber and below the mixing channel. The tub ring includes a deflector positioned adjacent to the plurality of apertures to define a dispensing slot below the chemistry mixing section.

According to another aspect, the mixing channel and the reservoir define an expanded turbulence section that receives the fluid carrier to generate a turbulent flow of the fluid carrier against an underside of the reservoir.

According to yet another aspect, the turbulence section defines a premix chamber that partially mixes the laundry chemistry with a fluid chamber.

According to another aspect of the present disclosure, the mixing channel includes a perforated plate and the laundry chemistry and the fluid carrier are directed downward through perforations of the mixing channel and toward the tub ring.

According to another aspect, a laundry appliance includes a rotating drum for processing articles of laundry. A cartridge housing includes a removable laundry cartridge that dispenses a laundry chemistry for delivery to the rotating drum. A mixing plate is positioned below the cartridge housing that defines a mixing channel. The mixing channel receives the laundry chemistry dispensed from the removable laundry cartridge. A fluid assembly delivers a fluid carrier through a flow path that includes the mixing channel. The mixing channel is defined between an underside of the removable laundry cartridge and an upper surface of the mixing plate. The laundry chemistry and the fluid carrier are delivered to a chemistry mixing section of a tub ring that is positioned above the rotating drum and below the mixing channel.

According to yet another aspect, the chemistry mixing section of the tub ring includes a plurality of apertures that are positioned to deliver the laundry chemistry and the fluid carrier to the rotating drum. The plurality of apertures direct the laundry chemistry and the fluid carrier toward a deflector and into the rotating drum.

According to another aspect of the present disclosure, the chemistry mixing section includes a cyclonic structure that mixes the laundry chemistry with the fluid carrier to define a processing fluid. The plurality of apertures are positioned proximate a rear of the cyclonic structure.

According to another aspect, the mixing channel includes a perforated plate and the laundry chemistry and the fluid carrier are directed downward through perforations of the mixing channel and toward the tub ring.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A chemistry dispensing assembly for an appliance, the chemistry dispensing assembly comprising:

a mixing channel positioned below a cartridge housing, wherein the mixing channel is positioned to receive a laundry chemistry from the cartridge housing;

a chemistry mixing section that is positioned below the cartridge housing and the mixing channel;

a plurality of fluid nozzles that are configured to deliver a fluid carrier through a flow path that includes the mixing channel and the chemistry mixing section; and a ring fluid nozzle that delivers a separate mixing stream of the fluid carrier into the chemistry mixing section for further diluting the laundry chemistry to define a processing fluid that is configured to be delivered into a treatment chamber.

2. The chemistry dispensing assembly of claim 1, wherein the chemistry mixing section is defined within a tub ring that is configured to be positioned above the treatment chamber.

3. The chemistry dispensing assembly of claim 1, wherein the chemistry mixing section includes a gutter and a plurality of apertures that are positioned at a base of the gutter, the plurality of apertures configured to deliver the processing fluid to the treatment chamber.

4. The chemistry dispensing assembly of claim 1, wherein the chemistry mixing section includes a cyclonic structure that cooperates with the separate mixing stream of the fluid carrier from the ring fluid nozzle to mix the laundry chemistry with the fluid carrier to define the processing fluid.

5. The chemistry dispensing assembly of claim 4, wherein the cyclonic structure delivers the laundry chemistry and the fluid carrier around the chemistry mixing section in a cyclonic motion and downward to a plurality of apertures that are defined within the chemistry mixing section, wherein the plurality of apertures are positioned proximate a rear of the cyclonic structure.

6. The chemistry dispensing assembly of claim 1, wherein the plurality of fluid nozzles are in communication with a plurality of fluid valves that correspond to the plurality of fluid nozzles, wherein each fluid valve corresponds to a cartridge receptacle of the cartridge housing.

7. The chemistry dispensing assembly of claim 3, wherein the chemistry mixing section includes a deflector that extends from an underside of the gutter, and wherein the plurality of apertures direct the processing fluid toward the deflector.

8. The chemistry dispensing assembly of claim 1, wherein the ring fluid nozzle and the plurality of fluid nozzles are in communication with a fluid assembly that delivers the fluid carrier.

9. The chemistry dispensing assembly of claim 5, wherein the ring fluid nozzle directs the separate mixing stream of the fluid carrier into the cyclonic structure for generating the cyclonic motion.

10. The chemistry dispensing assembly of claim 1, wherein the mixing channel includes a mixing plate having a plurality of perforations and the laundry chemistry and the fluid carrier are directed downward through the plurality of perforations and toward the chemistry mixing section.

11. The chemistry dispensing assembly of claim 1, wherein the mixing channel and the cartridge housing define an expanded turbulence section that receives the fluid carrier against an underside of a removable laundry cartridge disposed within the cartridge housing.

12. A chemistry dispensing assembly for an appliance, the chemistry dispensing assembly comprising:

- a mixing channel positioned below a reservoir and that selectively receives a laundry chemistry from the reservoir;
- a fluid assembly that delivers a fluid carrier through a flow path that includes the mixing channel, wherein the flow path is defined between an underside of the reservoir and an upper surface of the mixing channel;
- a chemistry mixing section that is separate from and positioned below the mixing channel that receives the fluid carrier and the laundry chemistry; and
- a ring fluid nozzle that delivers a separate mixing stream of the fluid carrier into the chemistry mixing section for further diluting the laundry chemistry to define a processing fluid that is delivered into a treatment chamber.

13. The chemistry dispensing assembly of claim 12, wherein the laundry chemistry and the fluid carrier are delivered from the mixing channel to the chemistry mixing section for further mixing with the fluid carrier to define the processing fluid.

14. The chemistry dispensing assembly of claim 12, wherein the chemistry mixing section includes a plurality of apertures that are configured to dispense the processing fluid into the treatment chamber.

15. The chemistry dispensing assembly of claim 14, wherein a deflector extends downward from the chemistry mixing section, wherein the deflector is positioned adjacent to the plurality of apertures to define a dispensing slot below the chemistry mixing section.

16. The chemistry dispensing assembly of claim 12, wherein the mixing channel and the reservoir define an expanded turbulence section that receives the fluid carrier to generate a turbulent flow of the fluid carrier against the underside of the reservoir.

17. The chemistry dispensing assembly of claim 16, wherein the expanded turbulence section defines a premix chamber that partially mixes the laundry chemistry with the fluid carrier.

18. The chemistry dispensing assembly of claim 12, wherein the mixing channel includes a perforated plate and the laundry chemistry and the fluid carrier are directed downward through perforations of the mixing channel and toward the chemistry mixing section.

19. A chemistry dispensing assembly for an appliance, the chemistry dispensing assembly comprising:

- a mixing plate configured to receive a laundry chemistry dispensed from a removable laundry cartridge; and
- a fluid assembly that delivers a fluid carrier through a flow path that includes the mixing plate, wherein
  - the laundry chemistry and the fluid carrier define a partially mixed solution that is delivered through perforations defined within the mixing plate and downward to a chemistry mixing section that is positioned below the mixing plate;
  - a separate mixing stream of the fluid carrier is delivered into the chemistry mixing section to combine with the partially mixed solution to define a processing fluid that is delivered to a treatment chamber; and
  - the chemistry mixing section includes a cyclonic structure that cooperates with the separate mixing stream of the fluid carrier to dilute the partially mixed solution to define the processing fluid.

20. The chemistry dispensing assembly of claim 19, wherein the chemistry mixing section includes a plurality of apertures that are positioned to deliver the processing fluid to the treatment chamber.

* * * * *